United States Patent
Kitora

(10) Patent No.: US 8,312,313 B2
(45) Date of Patent: Nov. 13, 2012

(54) INFORMATION PROCESSING APPARATUS, METHOD FOR CONTROLLING THE INFORMATION PROCESSING APPARATUS, AND STORAGE MEDIUM

(75) Inventor: Masakazu Kitora, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 201 days.

(21) Appl. No.: 12/652,684

(22) Filed: Jan. 5, 2010

(65) Prior Publication Data

US 2010/0174940 A1 Jul. 8, 2010

(30) Foreign Application Priority Data

Jan. 7, 2009 (JP) .................................. 2009-001734

(51) Int. Cl.
*G06F 11/00* (2006.01)
(52) U.S. Cl. .......... 714/5.11; 714/6.1; 714/22; 713/310; 713/340
(58) Field of Classification Search .................. 714/5.11, 714/6.1, 22; 713/310, 340
See application file for complete search history.

(56) References Cited

U.S. PATENT DOCUMENTS

| | | | | |
|---|---|---|---|---|
| 6,134,401 A * | 10/2000 | Yun et al. | .......................... | 399/70 |
| 6,381,204 B1 * | 4/2002 | Kobayashi et al. | .......... | 369/47.3 |
| 6,624,962 B1 * | 9/2003 | Kodama et al. | ................. | 360/75 |
| 6,816,981 B2 * | 11/2004 | Morita et al. | ................ | 714/6.22 |
| 7,127,189 B2 * | 10/2006 | Takamatsu et al. | ............. | 399/69 |
| 7,340,616 B2 * | 3/2008 | Rothman et al. | .............. | 713/300 |
| 7,386,661 B2 * | 6/2008 | Perozo et al. | ................. | 711/112 |
| 7,472,300 B1 * | 12/2008 | Haustein et al. | ............... | 713/323 |
| 7,516,348 B1 * | 4/2009 | Ofer | .............................. | 713/324 |
| 7,529,950 B2 * | 5/2009 | Deguchi et al. | ............... | 713/300 |
| 7,809,884 B1 * | 10/2010 | Linnell | ......................... | 711/114 |
| 7,809,979 B2 * | 10/2010 | Mochizuki et al. | ......... | 714/38.14 |
| 7,856,526 B2 * | 12/2010 | Shibayama et al. | ........... | 711/112 |
| 8,041,976 B2 * | 10/2011 | Kern et al. | ..................... | 713/324 |
| 8,140,754 B2 * | 3/2012 | Kaneda | .......................... | 711/117 |
| 2004/0039889 A1 | 2/2004 | Elder et al. | | |
| 2006/0007468 A1 * | 1/2006 | Tanaka | ......................... | 358/1.14 |
| 2006/0129703 A1 * | 6/2006 | Oshikawa et al. | .............. | 710/14 |
| 2006/0147226 A1 * | 7/2006 | Sato et al. | ..................... | 399/122 |
| 2006/0179344 A1 * | 8/2006 | Koike | .............................. | 714/6 |
| 2006/0198227 A1 * | 9/2006 | Okada | ........................... | 365/229 |
| 2006/0206753 A1 * | 9/2006 | Yamato et al. | .................... | 714/6 |
| 2007/0043968 A1 * | 2/2007 | Chen | ................................ | 714/6 |
| 2007/0079087 A1 * | 4/2007 | Wang et al. | .................... | 711/161 |
| 2007/0260358 A1 * | 11/2007 | Katoh | ........................... | 700/286 |
| 2008/0250085 A1 * | 10/2008 | Gray et al. | ..................... | 707/204 |
| 2008/0294857 A1 * | 11/2008 | Grimes et al. | ................ | 711/161 |

FOREIGN PATENT DOCUMENTS

JP 10-133784 A 5/1998
JP 2006-221335 8/2006

* cited by examiner

*Primary Examiner* — Scott Baderman
*Assistant Examiner* — Loan L. T. Truong
(74) *Attorney, Agent, or Firm* — Canon USA Inc. IP Division

(57) ABSTRACT

An information processing apparatus has a first storage unit and a second storage unit and operates in one of a normal power mode and a power saving mode. When the information processing apparatus is operating in the power saving mode, if an error occurs in a storage process, the power mode of the information processing apparatus is switched to the normal power mode and the storage process is executed again. The storage process is a process in which when the first storage unit is replaced with a new storage unit, information equivalent to that stored in the first storage unit is stored in the new storage unit.

13 Claims, 6 Drawing Sheets

INFORMATION PROCESSING APPARATUS, METHOD FOR CONTROLLING THE INFORMATION PROCESSING APPARATUS, AND STORAGE MEDIUM

BACKGROUND OF THE INVENTION

1. Field of the Invention

The present invention relates to an information processing apparatus that selectively operates in one of a normal power mode and a power saving mode, a method for controlling the information processing apparatus, and a storage medium.

2. Description of the Related Art

To improve system reliability of an information processing system having a storage device, such as a hard disk drive (HDD), it is necessary to take an appropriate measure in case of a failure in the storage device.

As an example of such a measure, there is a known technique in which an information processing system includes a plurality of storage devices to form a redundant array of inexpensive disks (RAID) system and perform a mirroring process. A mirroring process is a process in which when data is recorded in one storage device, a copy of the data is recorded in another storage device in case of a storage device failure.

If an error occurs in data stored in one of the plurality of storage devices in the information processing system where a mirroring process is performed, a restore process is executed. A restore process is a process in which when an error occurs in data stored in a storage device, data backed-up in another storage device is used to restore the data where the error has occurred.

If the data where the error has occurred cannot be restored even when the restore process is performed, the storage device itself needs to be replaced with a new one. After the storage device is replaced with a new storage device, it is necessary to execute a rebuild process to rebuild information in the new storage device. Japanese Patent Laid-Open No. 2006-221335 describes performing a rebuild process to rebuild information in a storage device.

In recent years, an information processing apparatus which has two different power modes to achieve lower power consumption during standby has been known. The two power modes include a normal power mode for normal operation, and a power saving mode which allows lower power consumption than that in the normal power mode.

When this information processing apparatus switches to the power saving mode, the supply of power to a predetermined module including a main control unit, the predetermined module being one of a plurality of modules constituting the information processing apparatus, is stopped. This makes it possible to reduce the total power consumption of the information processing apparatus.

However, to perform the rebuild process in the related art, it is necessary that the information processing apparatus be operating in the normal power mode (not in the power saving mode). This is because the main control unit, which is not supplied with power while the information processing apparatus is operating in the power saving mode, executes the rebuild process in the related art.

Since the information processing apparatus operates in the normal power mode during execution of the rebuild process, a larger amount of power continues to be consumed as compared to the case where the information processing apparatus operates in the power saving mode. In particular, when the rebuild process is performed for a storage device where data of several tens of gigabytes is stored, it may take several hours to complete the process. As a result, the problem of increased power consumption becomes more significant.

If it is made possible to execute the rebuild process for a storage device while the information processing apparatus is operating in the power saving mode, the following problem may arise. That is, when the power saving mode is entered, the supply of power to the main control unit of the information processing apparatus is stopped. Therefore, even if an error occurs during execution of the rebuild process, it is not possible to detect the occurrence of the error. As a result, even if the rebuild process does not complete normally, the storage device is left as it is.

Alternatively, the information processing apparatus may be made to return from the power saving mode to the normal power mode, every time the rebuild process completes. However, it is possible in this case that the information processing apparatus returns to the normal power mode even when the rebuild process has been successful. If the rebuild process has been successful, there is no need to immediately notify the main control unit of the success. However, since the information processing apparatus returns to the normal power mode, power is consumed unnecessarily.

SUMMARY OF THE INVENTION

It is desired to provide a mechanism that makes it possible to execute a rebuild process for a storage device while an information processing apparatus is operating in a power saving mode.

It is also desirable to provide a mechanism that controls, while an information processing apparatus is operating in a power saving mode, switching of a power mode depending on whether a rebuild process for a storage device has completed normally or an error has occurred.

According to an aspect of the present invention, an information processing apparatus having a first storage unit and a second storage unit and operating in one of a plurality of power modes including a normal power mode and a power saving mode includes a first control unit configured to operate while the information processing apparatus is operating in the normal power mode and to transmit an instruction to execute a storage process in which, when the first storage unit is replaced with a new storage unit, information equivalent to that stored in the first storage unit is stored in the new storage unit; a second control unit configured to execute the storage process in response to the instruction transmitted from the first control unit to execute the storage process; and a switching unit configured to execute a switching process in which, if an error occurs in the storage process executed by the second control unit while the information processing apparatus is operating in the power saving mode, the power mode of the information processing apparatus is switched to the normal power mode. The first control unit is further configured to transmit to the second control unit an instruction to execute the storage process again in response to the switching process executed by the switching unit. The second control unit is further configured to execute the storage process again in response to the instruction to execute the storage process again.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate numerous embodiments, features, and aspects of the invention and, together with the description, serve to explain the principles of the invention.

DESCRIPTION OF THE EXEMPLARY EMBODIMENTS

Figure 1:
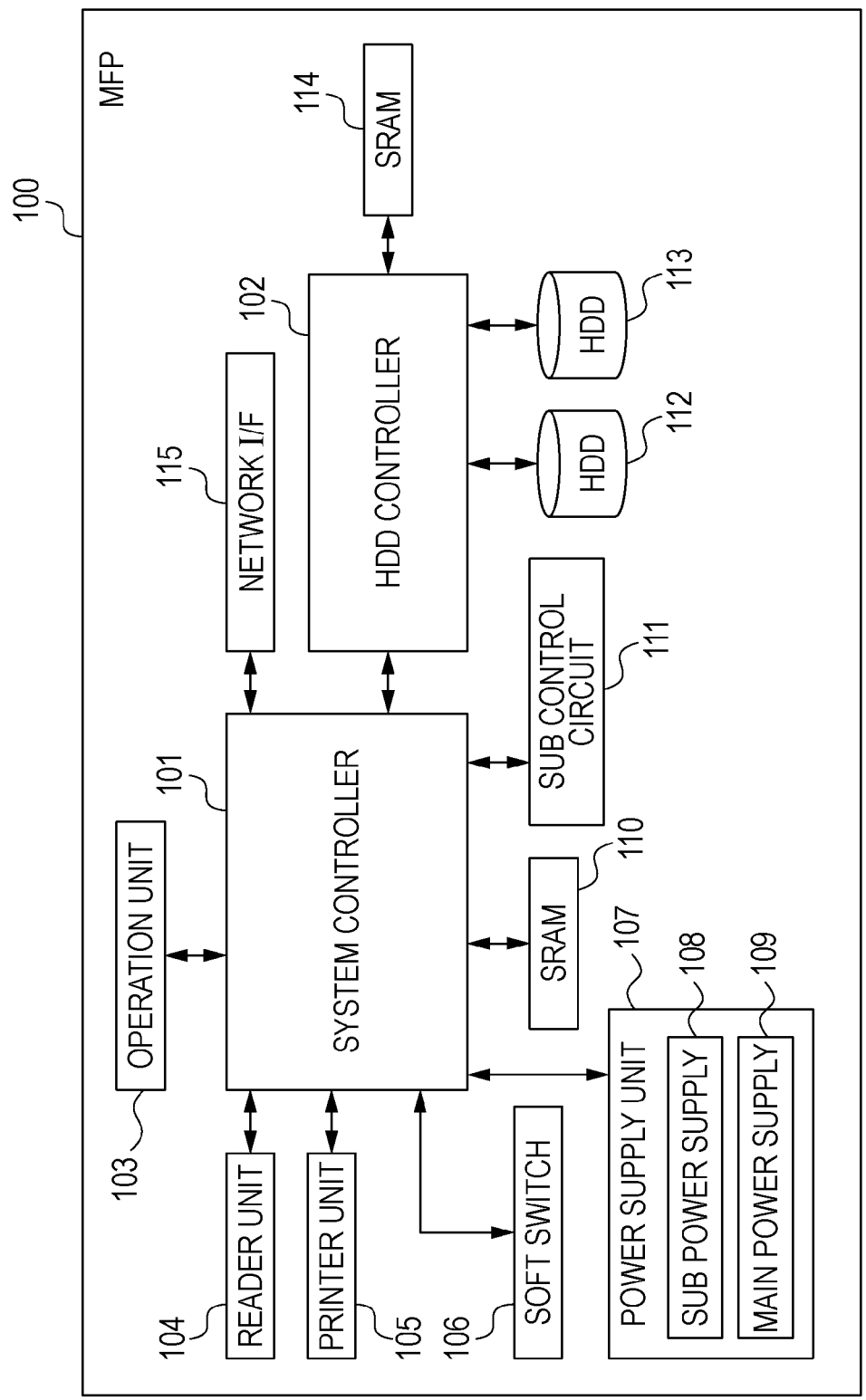
FIG. 1 is a block diagram illustrating a configuration of a multifunctional peripheral (MFP) according to an exemplary embodiment of the present invention.

The present invention will now be described in detail with reference to the drawings illustrating various exemplary embodiments of the present invention. In the drawings, elements and parts which are identical throughout the drawings are designated by identical reference numerals, and redundant description thereof is omitted.

Hereinafter, exemplary embodiments of the present invention will be described in detail with reference to the drawings. Note that the following exemplary embodiments are not intended to limit the present invention as defined in the claims, and not all combinations of features explained in the exemplary embodiments are essential to the solving means of the invention.

First Exemplary Embodiment

FIG. 1 a block diagram illustrating a configuration of a multifunctional peripheral (MFP) 100 according to an exemplary embodiment of the present invention.

A system controller 101 is a main control unit that controls an overall operation of the MFP 100. An HDD controller 102 is a subsidiary control unit (or sub-control unit) of the MFP 100. The system controller 101 is connected to the HDD controller 102 through a serial ATA (SATA), which is a general-purpose interface.

The HDD controller 102 uses a plurality of storage devices (a first storage unit (HDD 112) and a second storage unit (HDD 113)) in the MFP 100 to constitute a RAID system. The HDD controller 102 may use three or more storage units to constitute a RAID system. Here, the RAID level is "1" (which is a minimum level that allows execution of a mirroring process) or above.

The system controller 101 is connected to a reader unit 104 and a printer unit 105. The reader unit 104 is capable of reading an image on a document to generate image data. The reader unit 104 inputs the generated image data to the system controller 101. The printer unit 105 is capable of printing an image on a recording medium on the basis of image data output from the system controller 101. When a user inputs an instruction to execute a copy job, the printer unit 105 prints an image on the basis of image data generated by the reader unit 104. The reader unit 104 and the printer unit 105 each may have its own power supply unit, aside from a power supply unit 107 described below.

The power supply unit 107 includes two different power supplies, a main power supply 109 and a subsidiary (or sub) power supply 108. The MFP 100 selectively operates in one of two power modes, a normal power mode and a power saving mode. The normal power mode is a power mode for normal operation, while the power saving mode is a power mode which allows lower power consumption than that in the normal power mode. The main power supply 109 supplies power to predetermined modules in the MFP 100, the predetermined modules not operating in the power saving mode. On the other hand, the sub power supply 108 supplies power to all modules other than those to which the main power supply 109 supplies power.

The system controller 101 and an operation unit 103 are supplied with power from the main power supply 109, while the other modules are supplied with power from the sub power supply 108. That is, power is supplied to both the system controller 101 and the HDD controller 102 in the normal power mode, but is supplied to the HDD controller 102 and not to the system controller 101 in the power saving mode.

Although the power supply unit 107 is shown as having different power supplies in FIG. 1, a destination to which one power supply supplies power may alternatively be changed from one module to another by means of a switch.

A soft switch 106 notifies the system controller 101 of an instruction received from the user. By operating the soft switch 106, the user can give an instruction to switch the power mode of the MFP 100.

The operation unit 103 includes a keyboard and a liquid crystal display having a touch panel function. The operation unit 103 changes the displayed screen in accordance with display control performed by the system controller 101. No power is supplied to the operation unit 103 in the power saving mode.

A network interface (I/F) 115 allows the MFP 100 to connect to a local area network (LAN) (not shown). The MFP 100 is capable of receiving a print job from a host computer to which it is connected through the LAN. On the basis of image data contained in the received print job, the system controller 101 causes the printer unit 105 to execute a print process. If a print job is received through the network I/F 115 while the MFP 100 is operating in the power saving mode, the MFP 100 switches from the power saving mode to the normal power mode.

Figure 2:
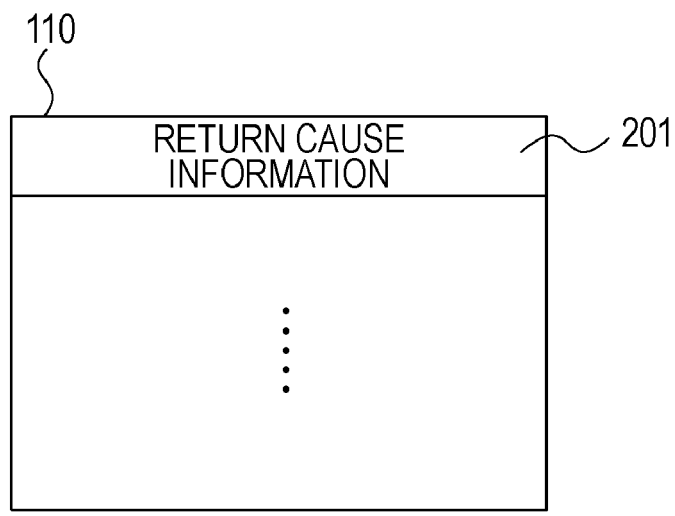
FIG. 2 illustrates information stored in a static random access memory (SRAM) according to an exemplary embodiment of the present invention.

FIG. 2 illustrates information stored in a static random access memory (SRAM) 110 (shown in FIG. 1) connected to the system controller 101. The SRAM 110 stores return cause information 201, which will be described in detail below.

A subsidiary (or sub) control circuit 111 is connected to the system controller 101. The sub control circuit 111 is supplied with power during operation in both the normal power mode and the power saving mode. When the HDD controller 102 executes a rebuild process while the MFP 100 is operating in the power saving mode, the sub control circuit 111 causes the MFP 100 to switch to the normal power mode in response to occurrence of an error in the rebuild process.

Figure 3:
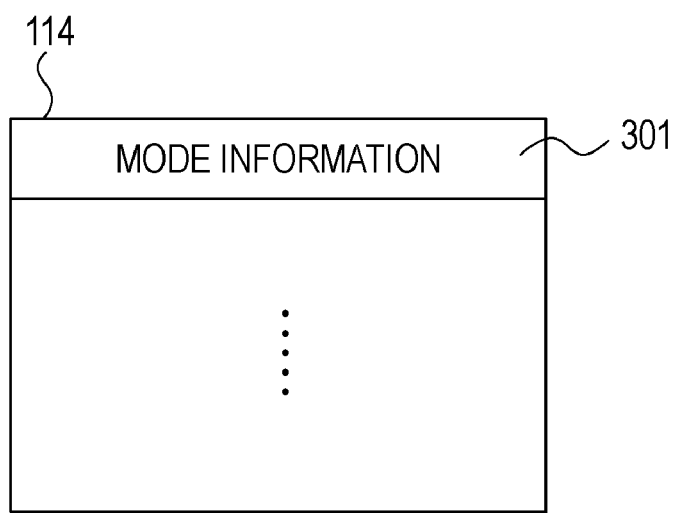
FIG. 3 illustrates information stored in another SRAM according to an exemplary embodiment of the present invention.

FIG. 3 illustrates information stored in an SRAM 114 (shown in FIG. 1) connected to the HDD controller 102. The SRAM 114 stores mode information 301 indicating a mode in which a RAID system provided by the HDD controller 102 is currently operating. One of the following values is stored as the mode information 301:

"00": Normal (Mirroring mode)
"01": Error correction in progress (Restore mode)
"02": Degraded (Degrade mode)
"03": HDD checking in progress (HDD check mode)
"04": HDD rebuilding in progress (Rebuild mode)
"10": Inoperable (Halt mode)

Figure 4:
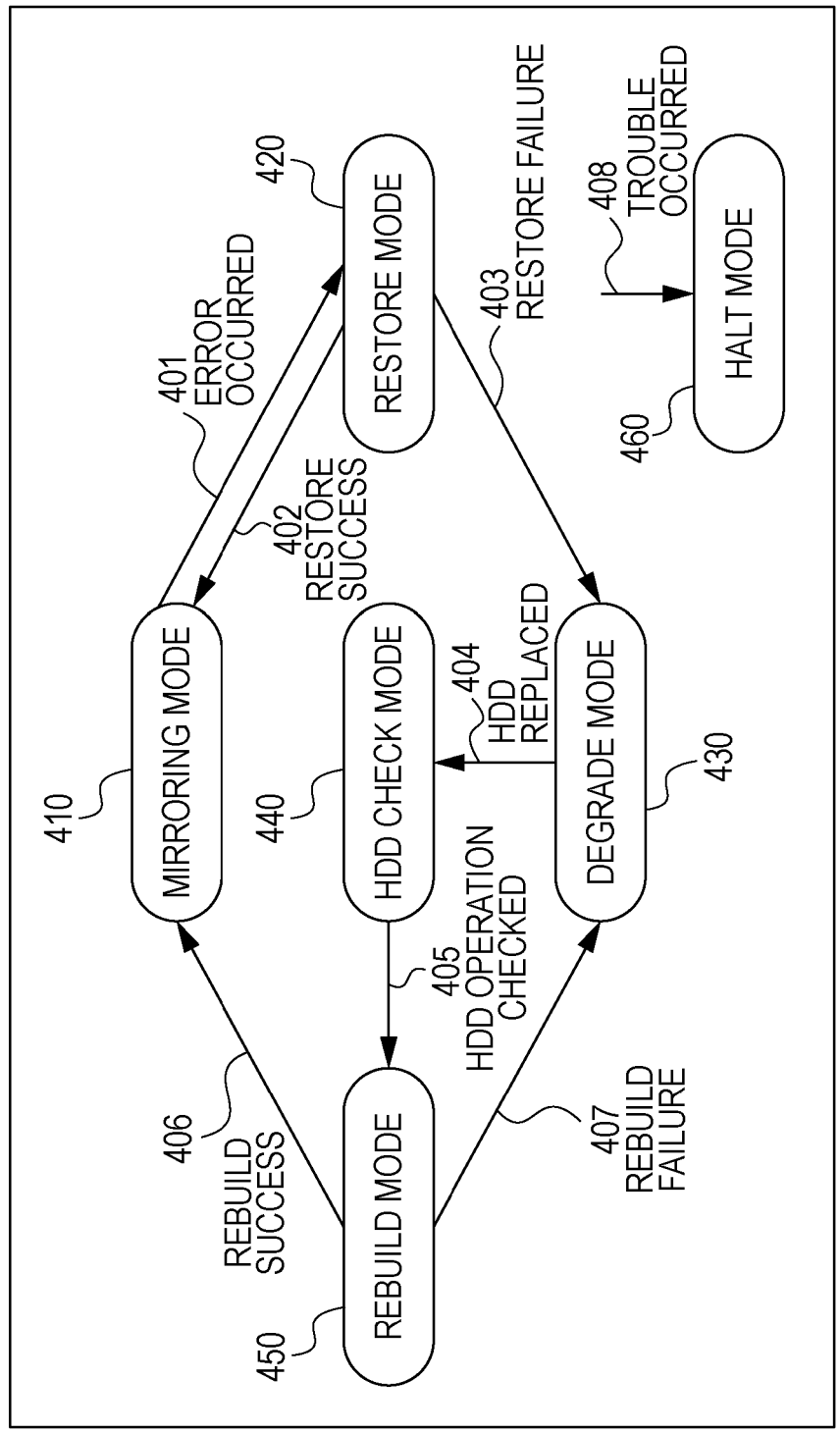
FIG. 4 conceptually illustrates a transition of each mode in a RAID system provided by an HDD controller according to an exemplary embodiment of the present invention.

FIG. 4 conceptually illustrates a transition of each mode in a RAID system provided by the HDD controller 102.

A mirroring mode 410 is a state in which a normal process is performed (i.e., a normal state). In the mirroring mode 410, when writing data to an HDD, the MFP 100 writes the same data to both the HDD 112 and the HDD 113.

If an error occurs in one of the HDD 112 and the HDD 113 during operation in the mirroring mode 410 (401), the mirroring mode 410 switches to a restore mode 420.

In the restore mode 420, a restore process, such as retrying access to the HDD where the error has occurred, is performed to restore a portion where the error has occurred. If the restore process is successful (402), the restore mode 420 switches back to the mirroring mode 410, in which a mirroring process starts again. If the restore process fails (403), the restore mode 420 switches to a degrade mode 430.

The degrade mode 430 is a state in which an error occurs in one of the HDD 112 and the HDD 113. The degrade mode 430 does not allow use of the HDD where the error occurs, so that a data write/read operation is performed only on the HDD where no error occurs. The degrade mode 430 continues while the user is replacing the HDD where the error occurs with a new one.

After the HDD where the error occurs is replaced (404), the degrade mode 430 switches to an HDD check mode 440. In the HDD check mode 440, an operation of (or access to) the new HDD added in the replacement is checked. If no error occurs in the operation check (405), the HDD check mode 440 switches to a rebuild mode 450.

In the rebuild mode 450, on the basis of information stored in the HDD where no error occurs (i.e., the HDD which has not been replaced), a rebuild process is executed to rebuild information in the new HDD. A rebuild process is a process for synchronizing a newly added HDD with an HDD which operates normally.

If the rebuild process in the rebuild mode 450 is successful (406), the rebuild mode 450 switches to the mirroring mode 410. If the rebuild process fails (407), the rebuild mode 450 switches back to the degrade mode 430.

A halt mode 460 is a state in which when an error occurs in any of the modes 410 to 450 and an out-of-control situation arises, the HDD controller 102 stops the HDD control operation. In any of the modes 410 to 450, the halt mode 460 is entered when there is occurrence of an error which allows no determination of a mode transition (408).

The HDD controller 102 is capable of allowing a free transition among the modes 410 to 460 in accordance with a request from the system controller 101.

Figure 5:
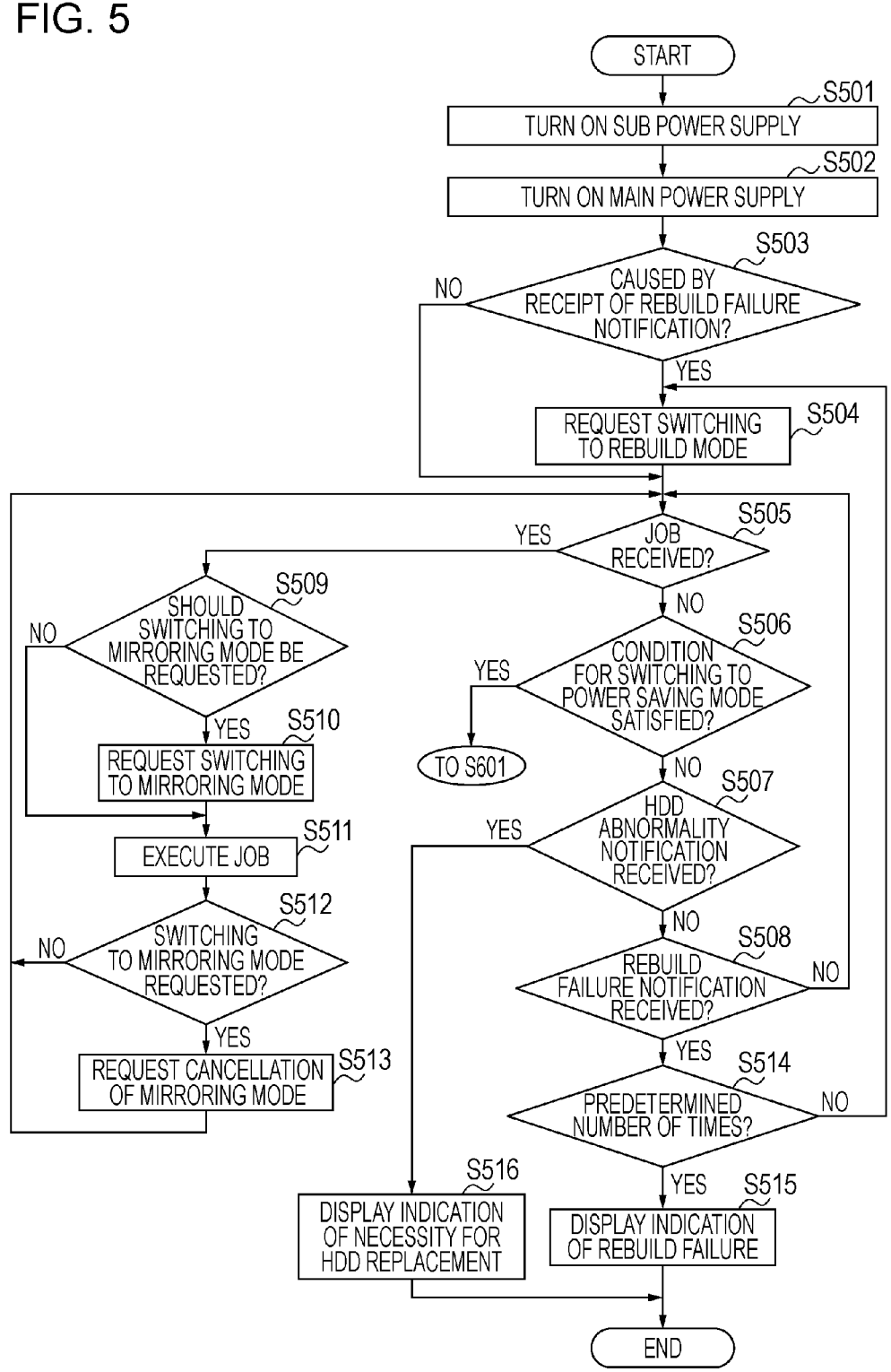
FIG. 5 is a flowchart illustrating a series of operations controlled by a system controller according to an exemplary embodiment of the present invention.
Figure 6:
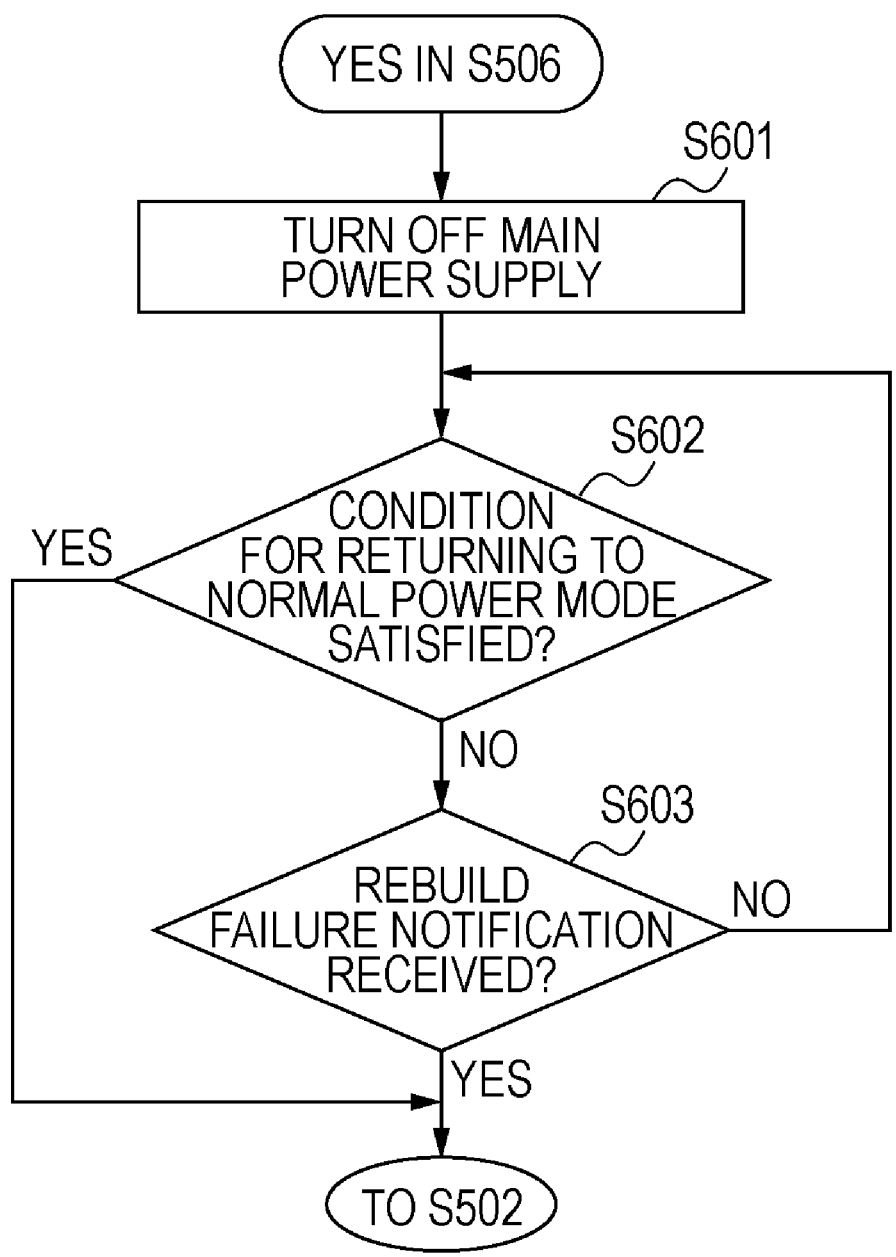
FIG. 6 is a flowchart also illustrating the series of operations controlled by the system controller.

FIG. 5 and FIG. 6 are flowcharts illustrating a series of operations controlled by the system controller 101 of the MFP 100. Each operation in the flowcharts of FIG. 5 and FIG. 6 is realized when the system controller 101 executes a control program.

When the user gives an instruction to start the MFP 100, the sub power supply 108 starts supplying power in step S501. The HDD controller 102 is also supplied with power, so that a mirroring process in the mirroring mode 410 starts.

In step S502, the main power supply 109 starts supplying power. In step S503, a determination is made as to whether the start of power supply from the main power supply 109 is caused by receipt of a rebuild failure notification from the HDD controller 102. If it is determined that the start of power supply from the main power supply 109 is caused by receipt of a rebuild failure notification from the HDD controller 102 (YES in step S503), the process proceeds to step S504.

Figure 7:
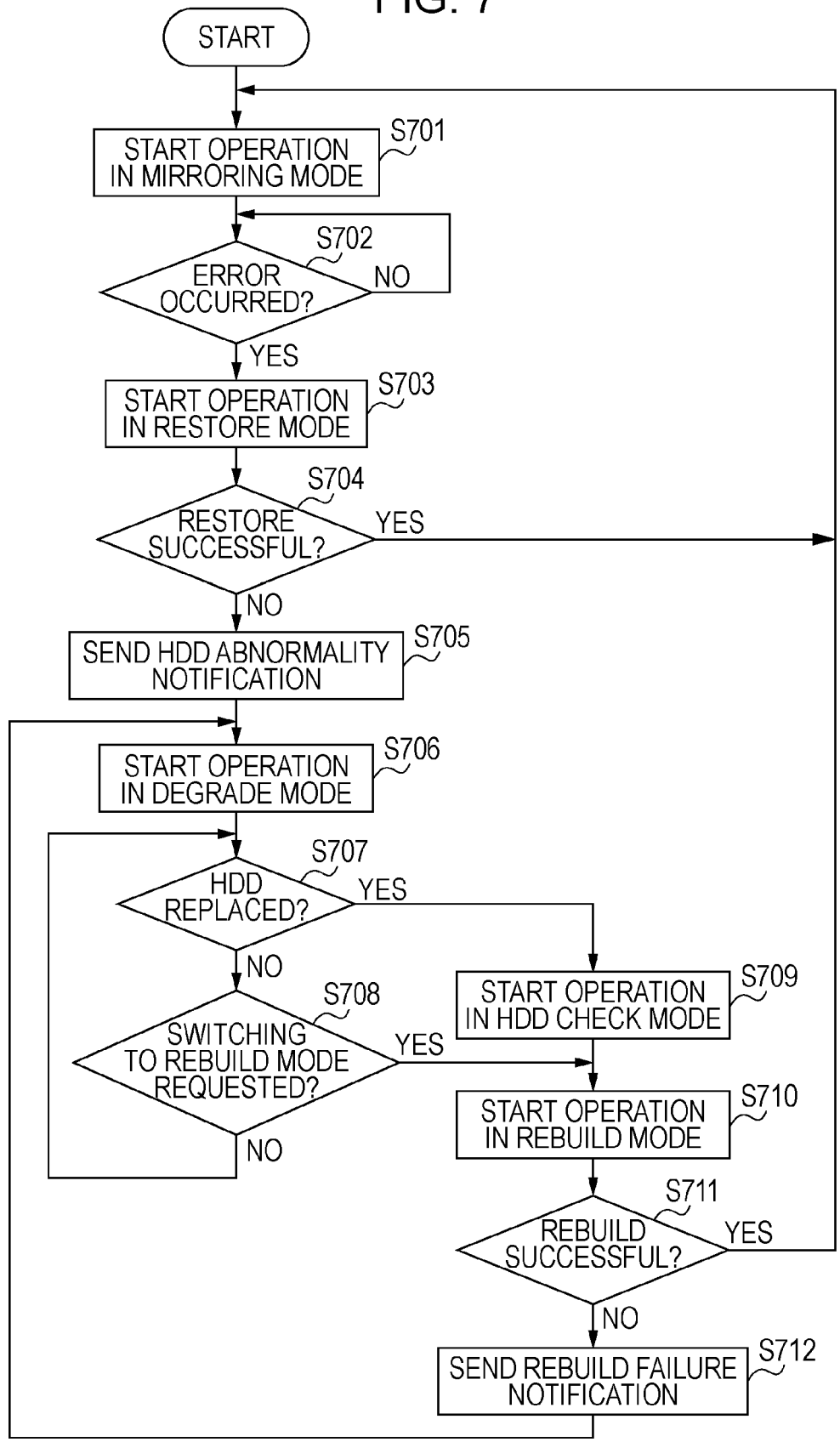
FIG. 7 is a flowchart illustrating a series of operations controlled by the HDD controller according to an exemplary embodiment of the present invention.

In step S504, the system controller 101 requests the HDD controller 102 to switch to the rebuild mode 450. The operation of step S504 causes a determination "YES" in step S708 (FIG. 7 showing the action of the HDD controller 102). Upon receipt of this request, the HDD controller 102 switches to the rebuild mode 450 and executes a rebuild process (step S710) again.

If it is determined in step S503 that the start of power supply from the main power supply 109 is not caused by receipt of a rebuild failure notification from the HDD controller 102 (NO in step S503), or upon completion of the operation in step S504, the process proceeds to step S505.

In step S505, a determination is made as to whether the MFP 100 has received a job (i.e., the user has given an instruction to execute a job). If it is determined that the MFP 100 has received a job (YES in step S505), the process proceeds to step S509, where a determination is made as to whether to request the HDD controller 102 to switch to the mirroring mode 410. Receiving a job means, for example, to receive an instruction to execute a copy job through the operation unit 103, or to receive a print job through the network I/F 115.

Before making a determination in step S509, the system controller 101 sends an inquiry to the HDD controller 102 about the current mode. Upon receipt of this inquiry, the HDD controller 102 refers to the mode information 301 stored in the SRAM 114 and sends the current mode back to the system controller 101 as a response.

If the current mode is a mode other than the mirroring mode 410, the system controller 101 determines that a request to switch to the mirroring mode 410 should be made. This is because if the mirroring mode 410 is entered temporarily during job execution, data can be reliably stored in an HDD. If the current mode is the degrade mode 430, the mirroring mode 410 cannot be entered. In this case, the system controller 101 may determine that a request to switch to the mirroring mode 410 should not be made.

In step S510, the system controller 101 requests the HDD controller 102 to switch to the mirroring mode 410. Then, the received job is executed in step S511.

In step S512, a determination is made as to whether a request to switch to the mirroring mode 410 has been made in step S510. If the request has been made (YES in step S512), the process proceeds to step S513 and if not (NO in step S512), the process returns to step S505. In step S513, the system controller 101 requests the HDD controller 102 to cancel the temporary switching to the mirroring mode 410.

If it is determined in step S505 that no job has been received (NO in step S505), the process proceeds to step S506, where a determination is made as to whether a predetermined condition for switching to the power saving mode is satisfied. The predetermined condition is, for example, that a predetermined time has elapsed without any user operation, or that an instruction to switch to the power saving mode has been given by the user through operation of the soft switch 106.

If it is determined that a predetermined condition for switching to the power saving mode is satisfied (YES in step S506), the process proceeds to step S601 of FIG. 6 and if not (NO in step S506), the process proceeds to step S507.

In step S507, a determination is made as to whether an HDD abnormality notification indicating occurrence of an HDD abnormality has been received. The operation of step S705 (by the HDD controller 102 in FIG. 7) causes a determination "YES" in step S507. The occurrence of an HDD abnormality means that a restore process in the restore mode 420 has failed (403 of FIG. 4). The HDD abnormality notification is transmitted by the HDD controller 102 in step S705 of FIG. 7 (described below).

If an HDD abnormality notification has been received (YES in step S507), the process proceeds to step S516. In step S516, the system controller 101 causes the operation unit 103 to display a screen indicating that the HDD needs to be replaced. Then, the process ends. Information for identifying the HDD in which the abnormality has occurred may be displayed on the screen in step S516.

If it is determined in step S507 that no HDD abnormality notification has been received (NO in step S507), the process proceeds to step S508. In step S508, a determination is made as to whether a rebuild failure notification indicating failure of an HDD rebuild process has been received from the HDD controller 102. The operation of step S712 (FIG. 7) causes a determination "YES" in step S508.

If it is determined in step S508 that a rebuild failure notification has been received (YES in step S508), the process proceeds to step S514. In step S514, a determination is made as to whether the number of times a rebuild process has failed has reached a predetermined value. If it is determined that the number of times a rebuild process has failed has not reached a predetermined value (NO in step S514), the process returns to step S504, where the system controller 101 requests the HDD controller 102 to switch to the rebuild mode 450 again. In the present embodiment, the system controller 101 counts the number of times a rebuild process has failed and determines whether the number of times a rebuild process has failed has reached a predetermined value. Alternatively, the counting and determination may be partially or completely performed by the HDD controller 102.

If it is determined in step S514 that the number of times a rebuild process has failed has reached a predetermined value (YES in step S514), the process proceeds to step S515. In step S515, the system controller 101 causes the operation unit 103 to display a screen indicating that an HDD rebuild process has failed. Then, the process ends.

If it is determined in step S508 that no rebuild failure notification has been received (NO in step S508), the process returns to step S505, from which the determinations of steps S505 to S508 are repeated iteratively. The state where the determinations of steps S505 to S508 are repeated iteratively is a waiting state (standby state) of the MFP 100 that is operating in the normal power mode.

In step S601 of FIG. 6, the system controller 101 causes the main power supply 109 to stop supplying power.

In step S602, a determination is made as to whether a predetermined condition for switching from the power saving mode to the normal power mode is satisfied. Before the determination in step S602, the main power supply 109 is turned on through the soft switch 106 or the network I/F 115, and supplies power to the system controller 101. The predetermined condition is, for example, that an instruction to return to the normal power mode has been given by the user through operation of the soft switch 106, or that a print job has been received through the network I/F 115.

If it is determined in step S602 that a predetermined condition for switching from the power saving mode to the normal power mode is satisfied (YES in step S602), the process returns to step S502 and if not (NO in step S602), the process proceeds to step S603.

In step S603, a determination is made as to whether a rebuild failure notification indicating that an HDD rebuild process has failed has been received from the HDD controller 102. Before the determination, the main power supply 109 is turned on by the HDD controller 102 and supplies power to the system controller 101. If it is determined that the rebuild failure notification has been received (YES in step S603), the process returns to step S502. If it is determined that no rebuild failure notification has been received (NO in step S603), the process returns to step S602, from which the determinations of steps S602 and S603 are repeated iteratively. The state where the determinations of steps S602 and S603 are repeated iteratively is a waiting state (sleep state) of the MFP 100 that is operating in the power saving mode.

Next, operations of the HDD controller 102 will be described with reference to FIG. 7. FIG. 7 is a flowchart illustrating a series of operations controlled by the HDD controller 102 of the MFP 100. Each operation in the flowchart of FIG. 7 is realized when the HDD controller 102 executes a control program.

In step S701, an operation in the mirroring mode 410 starts. Specifically, a mirroring process which involves writing the same data to both the HDD 112 and the HDD 113 is executed.

In step S702, a determination is made as to whether an error has occurred in the HDD 112 or the HDD 113 during execution of the mirroring process. If no error has occurred (NO in step S702), the mirroring mode 410 continues. If an error has occurred (YES in step S702), the process proceeds to step S703. This process corresponds to 401 of FIG. 4.

In step S703, an operation in the restore mode 420 starts. Specifically, a restore process for restoring the HDD (or data) in which the error has occurred is executed. In step S704, a determination is made as to whether the restore process has been successful.

If the restore process has been successful (YES in step S704), the process returns to step S701, where an operation in the mirroring mode 410 starts again. This process corresponds to 402 of FIG. 4. If the restore process has failed (NO in step S704), the process proceeds to step S705. This process corresponds to 403 of FIG. 4.

In step S705, an HDD abnormality notification indicating occurrence of an HDD abnormality is transmitted to the system controller 101. The operation of step S705 causes a determination "YES" in step S507 (FIG. 5).

In step S706, an operation in the degrade mode 430 starts. In the degrade mode 430, the HDD where the error occurs is not used, and a data read/write operation is performed only on an HDD where no error occurs.

In step S707, a determination is made as to whether the HDD has been replaced with a new one. If it is determined that the HDD has been replaced (YES in step S707), the process proceeds to step S709, where an operation in the HDD check mode 440 starts. This process corresponds to 404 of FIG. 4. Specifically, an operation of (or access to) the new HDD added in the replacement is checked in step S709.

On the other hand, if it is determined that the HDD has not been replaced (NO in step S707), the process proceeds to step S708, where a determination is made as to whether the system controller 101 has requested switching to the rebuild mode 450. The operation of step S504 (FIG. 5) causes a determination "YES" in step S708. That is, if the system controller 101 requests switching to the rebuild mode 450 in step S504 of FIG. 5, it is determined in step S708 that switching to the rebuild mode 450 has been requested.

If it is determined that switching to the rebuild mode 450 has been requested (YES in step S708), the process proceeds to step S710 and if not, the process returns to step S707.

In step S710, an operation in the rebuild mode 450 starts. Specifically, a rebuild process is executed, so that information stored in the HDD in which no error has occurred (i.e., the HDD having not been replaced) is rebuilt in the new HDD added in the replacement.

In step S711, a determination is made as to whether the rebuild process has been successful. If the rebuild process has been successful (YES in step S711), the process returns to step S701, where an operation in the mirroring mode 410 starts again. On the other hand, if the rebuild process has failed (i.e., if an error has occurred during the rebuild process) (NO in step S711), the process proceeds to step S712.

In step S712, a rebuild failure notification indicating that the HDD rebuild process has failed is transmitted through the sub control circuit 111 to the system controller 101. The operation of step S712 causes a determination "YES" in step S508 (FIG. 5). After the rebuild failure notification is transmitted in step S712, the process returns to step S706, where the degrade mode 430 starts again.

When the rebuild failure notification is transmitted in step S712, the return cause information 201 in the SRAM 110 is updated at the same time. Specifically, a value "01" is stored as information for identifying that the return from the power saving mode to the normal power mode is caused by the failure of the rebuild process during operation in the power saving mode.

The system controller 101 makes the determination in step S503 (FIG. 5) by referring to the return cause information 201 in the SRAM 110. A default value "00" is stored as the return cause information 201. If the process proceeds from step S501 or step S602 to step S502, the system controller 101 reads the value "00" from the SRAM 110. On the other hand, if the process proceeds from step S603 to step S502, the value "00" stored as the return cause information 201 is updated to "01". Therefore, if the process proceeds from step S603 to step S502, the system controller 101 reads the value "01" from the SRAM 110.

If the read value is "01", the system controller 101 determines that the start of power supply from the main power supply 109 is caused by receipt of a rebuild failure notification from the HDD controller 102. If the read value is "00", the system controller 101 determines that the start of power supply from the main power supply 109 is not caused by receipt of a rebuild failure notification from the HDD controller 102.

As described above, in the present exemplary embodiment, in addition to the system controller 101 serving as a main control unit of the MFP 100, the HDD controller 102 is provided as a subsidiary or secondary control unit (i.e. a sub-control unit) of the MFP 100. The HDD controller 102 is supplied with power from the sub power supply 108 even when the MFP 100 is operating in the power saving mode. The HDD controller 102 forms a RAID system including the HDD 112 and the HDD 113, and executes a rebuild process when one of the HDD 112 and the HDD 113 is replaced with another one. Since an HDD rebuild process can be executed even when the MFP 100 is operating in the power saving mode, it is possible to reduce power consumption of the MFP 100 during execution of the rebuild process.

When an HDD rebuild process completes normally while the MFP 100 is operating in the power saving mode (YES in step S711 of FIG. 7), the MFP 100 does not return from the power saving mode to the normal power mode. Thus, it is possible to prevent the MFP 100 from unnecessarily returning to the normal power mode and thus to prevent an increase in power consumption.

If an error occurs in an HDD rebuild process while the MFP 100 is operating in the power saving mode (NO in step S711 of FIG. 7), the MFP 100 returns from the power saving mode to the normal power mode. Thus, the system controller 101 serving as a main control unit of the MFP 100 can detect the occurrence of an error in the HDD rebuild process (YES in step S503 of FIG. 5). Thus, on the basis of its own determination, the system controller 101 can request the HDD controller 102 to switch to the rebuild mode 450 (step S504 of FIG. 5) and can send a rebuild failure notification to the user (step S515 of FIG. 5), and then potentially re-enter the MFP into a power-saving mode. Additionally, even when an error occurs in the rebuild process executed by the HDD controller 102 and the halt mode 460 is entered, if the system controller 101 requests switching to the mirroring mode 410, it is possible to execute a rebuild process again and return the MFP to the power-saving mode.

Other Exemplary Embodiments

Exemplary embodiments of the present invention have been described in detail in relation to the rebuild process in mirroring. Alternatively, the present invention may be applied to another data reconstruction process in a different type of RAID system, instead of the rebuild process in mirroring described above.

The present invention can be embodied, for example, as a system, an apparatus, a method, a program, or a storage medium (recording medium). Specifically, the present invention may be applied to a system including a plurality of devices, or to an apparatus constituted by a single device.

A software program that is capable of causing an MFP to carry out the methods of the illustrated flowcharts in the exemplary embodiments and that implements the functions of the exemplary embodiments may be supplied directly or remotely from an external apparatus to a system or apparatus of the above-described embodiments. The above-described embodiments can be implemented when a computer of the system or apparatus reads and executes supplied program code.

Accordingly, since the functions described above may be implemented by a computer, the program code installed in the computer also implements the above-described embodiments.

In this case, the computer program may be object code, a program executed by an interpreter, script data supplied to an operating system (OS), or the like, as long as it causes the MFP to carry out the methods described.

Examples of recording media for supplying the program include a floppy disk, a hard disk, an optical disk, a magneto-optical (MO) disk, a compact-disk read-only memory (CD-ROM), a CD recordable (CD-R), a CD-rewritable (CD-RW), a magnetic tape, a non-volatile type memory card, a ROM, and a digital versatile disk (DVD) (DVD-ROM and DVD-R).

The program may be supplied by downloading it from a homepage on the Internet to a recording medium, such as a hard disk, using a browser of a client computer. That is, the computer program may be supplied by connecting to a homepage and downloading, from the homepage, the program itself or an automatically-installable compressed file of the program. The program may be supplied by dividing the program code constituting the program into a plurality of files, and downloading the files from different homepages. In other words, a World Wide Web (WWW) server that allows multiple users to download the program files for implementing the functions described above by computer may also be supplied.

It is also possible to encrypt the program, store the encrypted program in a computer-readable storage medium such as a CD-ROM, distribute the storage medium to users, allow users who satisfy predetermined conditions to download decryption key information from a website via the Internet, and allow these users to decrypt the encrypted program by using the key information. Thus, the decrypted program is executed, installed in the computer, and implemented.

The functions of the above-described exemplary embodiments may be implemented when the computer executes the read program. Also, when an OS or the like running on the computer performs all or a part of actual processing in accordance with an instruction of the program, the functions of the above-described exemplary embodiments can be implemented by this processing.

Furthermore, after the program read from a recording medium is written to a function expansion board inserted in the computer or to a memory provided in a function expansion unit connected to the computer, a CPU or the like mounted on the function expansion board or function expansion unit may perform all or a part of the actual processing in accordance with an instruction of the program, so that the functions of the above-described exemplary embodiments can be implemented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2009-001734 filed Jan. 7, 2009, which is hereby incorporated by reference herein in its entirety.

What is claimed is:

1. An information processing apparatus operable in one of a plurality of power modes including a normal power mode and a power saving mode, the information processing apparatus comprising:
    a first storage unit and a second storage unit, the second storage unit being arranged to store a copy of the information stored in the first storage unit;
    a first control unit configured to transmit an instruction to execute a storage process in which, when the first storage unit is replaced with a new storage unit, information stored in the second storage unit is stored in the new storage unit;
    a second control unit configured to execute the storage process in response to the instruction transmitted from the first control unit to execute the storage process; and
    a switching unit configured to execute a switching process in which, if an error occurs in the storage process executed by the second control unit while the information processing apparatus is operating in the power saving mode, the power mode of the information processing apparatus is switched from the power saving mode to the normal power mode,
    wherein the first control unit is further configured to transmit to the second control unit an instruction to execute the storage process again in response to the switching process executed by the switching unit; and
    the second control unit is further configured to execute the storage process again in response to the instruction to execute the storage process again.

2. The information processing apparatus according to claim 1, further comprising a notification unit configured to send a notification if an error occurs in one of the first storage unit and the second storage unit, the notification indicating the occurrence of the error,
    wherein, after the notification unit sends the notification, when the storage unit in which the error has occurred is replaced, the second control unit is configured to execute the storage process.

3. The information processing apparatus according to claim 1, further comprising a requesting unit configured to request the second control unit to execute the storage process again if switching of the power mode of the information processing apparatus from the power saving mode to the normal power mode is caused by occurrence of an error in the storage process executed by the second control unit.

4. The information processing apparatus according to claim 3, further comprising a determining unit configured to determine, when the power mode of the information processing apparatus has been switched from the power saving mode to the normal power mode, whether the switching of the power mode is caused by occurrence of an error in the storage process executed by the second control unit,
    wherein the requesting unit is configured to request the second control unit to execute the storage process again if the determining unit determines that the switching of the power mode is caused by occurrence of an error in the storage process executed by the second control unit, and the requesting unit is configured not to request the second control unit to execute the storage process again if the determining unit determines that the switching of the power mode is not caused by occurrence of an error in the storage process executed by the second control unit.

5. The information processing apparatus according to claim 3, wherein, if a predetermined condition is satisfied after the requesting unit requests the second control unit to execute the storage process again, the switching unit is configured to switch the power mode of the information processing apparatus from the normal power mode to the power saving mode.

6. The information processing apparatus according to claim 1, further comprising a display unit configured to display a screen when the number of errors that have occurred in the storage process executed by the second control unit reaches a predetermined value, the screen indicating that storage of the information in the new storage unit has failed.

7. The information processing apparatus according to claim 2, further comprising a mirroring unit configured to execute a mirroring process between the first storage unit and the second storage unit.

8. The information processing apparatus according to claim 7, further comprising a restoring unit configured to execute a restore process in which, if an error occurs in the first storage unit or the second storage unit while the mirroring unit is executing the mirroring process, a portion where the error has occurred is restored.

9. The information processing apparatus according to claim 8, wherein the notification unit is configured to send a notification if an error occurs in the restore process executed by the restoring unit.

10. The information processing apparatus according to claim 1, wherein the switching unit is configured not to execute the switching process when the storage process executed by the second control unit completes normally while the information processing apparatus is operating in the power saving mode.

11. The information processing apparatus according to claim 1, wherein the information processing apparatus is a printer for printing images on sheets.

12. A method for controlling an information processing apparatus having a first storage unit and a second storage unit and operable in one of a plurality of power modes including a normal power mode and a power saving mode, the method comprising:

transmitting, by a first control unit, an instruction to execute a storage process in which, when the first storage unit is replaced with a new storage unit, information stored in the second storage unit is stored in the new storage unit;

executing, by a second control unit, the storage process in response to the instruction to execute the storage process;

executing a switching process in which, if an error occurs in the storage process executed by the second control unit while the information processing apparatus is operating in the power saving mode, the power mode of the information processing apparatus is switched from the power saving mode to the normal power mode;

transmitting an instruction, from the first control unit to the second control unit, to execute the storage process again in response to execution of the switching process; and executing, by the second control unit, the storage process again in response to the instruction to execute the storage process again.

13. A computer-readable storage medium, storing a computer-executable process, the computer executable process causing a computer to perform a method for controlling an information processing apparatus having a first storage unit and a second storage unit and operable in one of a plurality of power modes including a normal power mode and a power saving mode, the method comprising:

transmitting, by a first control unit, an instruction to execute a storage process in which, when the first storage unit is replaced with a new storage unit, information stored in the first storage unit is stored in the new storage unit;

executing, by a second control unit, the storage process in response to the instruction to execute the storage process;

executing a switching process in which, if an error occurs in the storage process executed by the second control unit while the information processing apparatus is operating in the power saving mode, the power mode of the information processing apparatus is switched from the power saving mode to the normal power mode;

transmitting an instruction, from the first control unit to the second control unit, to execute the storage process again in response to execution of the switching process; and executing, by the second control unit, the storage process again in response to the instruction to execute the storage process again.

* * * * *